(12) United States Patent
Sanchez et al.

(10) Patent No.: US 7,652,583 B2
(45) Date of Patent: Jan. 26, 2010

(54) METHOD AND SYSTEM FOR MAINTAINING OPERATOR ALERTNESS

(75) Inventors: Julian Sanchez, Bettendorf, IA (US); Jerry Richard Duncan, Bettendorf, IA (US)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 11/688,375

(22) Filed: Mar. 20, 2007

(65) Prior Publication Data

US 2008/0231461 A1    Sep. 25, 2008

(51) Int. Cl.
    *G08B 23/00* (2006.01)
(52) U.S. Cl. .................................. 340/575; 340/576
(58) Field of Classification Search ............... 340/575, 340/576, 439; 180/272
    See application file for complete search history.

(56) References Cited

U.S. PATENT DOCUMENTS

| | | | | |
|---|---|---|---|---|
| 4,359,725 A * | 11/1982 | Balogh et al. | ............... | 340/576 |
| 5,035,500 A | 7/1991 | Rorabaugh et al. | | |
| 5,769,085 A | 6/1998 | Kawakami et al. | | |
| 5,808,374 A | 9/1998 | Miller et al. | | |
| 5,925,082 A * | 7/1999 | Shimizu et al. | ............. | 180/272 |
| 6,147,612 A | 11/2000 | Ruan et al. | | |
| 6,313,749 B1 | 11/2001 | Horne et al. | | |
| 6,575,902 B1 * | 6/2003 | Burton | ............. | 340/575 |
| 6,580,973 B2 | 6/2003 | Leivian et al. | | |
| 6,625,485 B2 * | 9/2003 | Levendowski et al. | ...... | 340/575 |
| 6,756,903 B2 * | 6/2004 | Omry et al. | ............. | 340/576 |
| 6,822,573 B2 * | 11/2004 | Basir et al. | ............. | 340/575 |
| 6,894,606 B2 * | 5/2005 | Forbes et al. | ............. | 340/575 |
| 6,925,425 B2 | 8/2005 | Remboski et al. | | |
| 6,946,966 B2 * | 9/2005 | Koenig | ............. | 340/576 |
| 7,126,485 B2 * | 10/2006 | Cece et al. | ............. | 340/576 |
| 7,266,430 B2 * | 9/2007 | Basson et al. | ............. | 340/439 |
| 7,301,465 B2 * | 11/2007 | Tengshe et al. | ............. | 340/575 |
| 2003/0181822 A1 | 9/2003 | Victor | | |
| 2003/0220814 A1 | 11/2003 | Gordon | | |

(Continued)

OTHER PUBLICATIONS

Ayoob, Ellen et al. Driver-Vehicle-Interface (DVI) Development of a Drowsy Driver Detection and Warning System for Commercial Vehicles. Robotics Institute, Carnegie Mellon University, Pittsburg, PA. Sep. 2005. [retrieved on Dec. 20, 2006]. Retrieved from the Internet:<URL:http://www.ri.cmu.edu/people/steinfeld_aaron.html>.

(Continued)

*Primary Examiner*—John A Tweel, Jr.
(74) *Attorney, Agent, or Firm*—Yee & Associates, P.C.; Marilyn Smith Dawkins (57) ABSTRACT

A method and system for maintaining operator alertness comprises a detector for detecting a physical status of an operator. The physical status indicates a first level of operator alertness. A user interface requests a second level of operator alertness from a self-evaluation of the operator at a request time. An evaluator measures at least one of an accuracy of the operator response to the requested input and a response time of the operator from the request time. An alert module generates alarm data or an alarm signal to alert the operator based on the first level of operator alertness indicating an inattentive state and at least one of the measured accuracy and operator response time indicating the inattentive state.

24 Claims, 5 Drawing Sheets

U.S. PATENT DOCUMENTS

2004/0193068 A1    9/2004    Burton et al.
2007/0024454 A1*   2/2007    Singhal ...................... 340/576

OTHER PUBLICATIONS

Stanford Sleepiness Scale Web Page. [retrieved on Oct. 18, 2006]. Retrieved from the Internet:<URL:http://www.stanford.edu/-dement/sss.html>.

Attention Technologies, Inc. Web Page. [retrieved on Dec. 20, 2006]. Retrieved from the Internet:<URL:http://www.attentiontechnology.com/pro.html>.

Web Page Advertisement for "Seeing Machines". [retrieved on Dec. 20, 2006] Retrieved from the Internet:<http://www.seeingmachines.com/facelab.htm>.

Grace, Richard et al. The Carnegie Mellon Trucksim: A Tool To Improve Driving Safety. pp. 135-1 through 135-8. Published by IEEE.1998.

Freund, Deborah et al. A Holistic Approach to Operator Alertness Research. Presented Jan. 22-28, 1995 in Washington, D.C. at the 74th Annual Meeting of the Transportation Research Board.

Federal Motor Carrier Safety Administration. Commercial Motor Vehicle/Driver Fatique and Alertness Study. [retrieved on Oct. 18, 2006]. Retrieved from the Internet:<URL:http://www.fmcsa.dot.gov/facts-research/research-technology/publications/cmvfatiquestudy.htm>.

* cited by examiner

METHOD AND SYSTEM FOR MAINTAINING OPERATOR ALERTNESS

FIELD OF THE INVENTION

This invention relates to a method and system for maintaining operator alertness.

BACKGROUND OF THE INVENTION

If an operator of a vehicle or other equipment is inattentive, drowsy, or otherwise not alert, the operator may pose a safety risk to himself and others. Although some detection systems exist for detecting the physical status of an operator, such systems may suffer from false positives of operator inattentiveness, for example. If an operator shifts his position, leans forward or turns his head, the detection system may incorrectly determine that the operator is inattentive. Thus, there is a need for a method and system for maintaining operator alertness that accurately determines the true extent of operator alertness.

SUMMARY OF THE INVENTION

A method and system for maintaining operator alertness comprises a detector for detecting a physical status of an operator. The physical status indicates a first level of operator alertness. A user interface requests input from the operator at a request time. An evaluator measures at least one of an accuracy of the operator response to the requested input and a response time of the operator from the request time. An alert module generates alarm data or an alarm signal to alert the operator based on the first level of operator alertness indicating an inattentive state and at least one of the measured accuracy and operator response time indicating the inattentive state.

DESCRIPTION OF THE PREFERRED EMBODIMENTS

Figure 1:
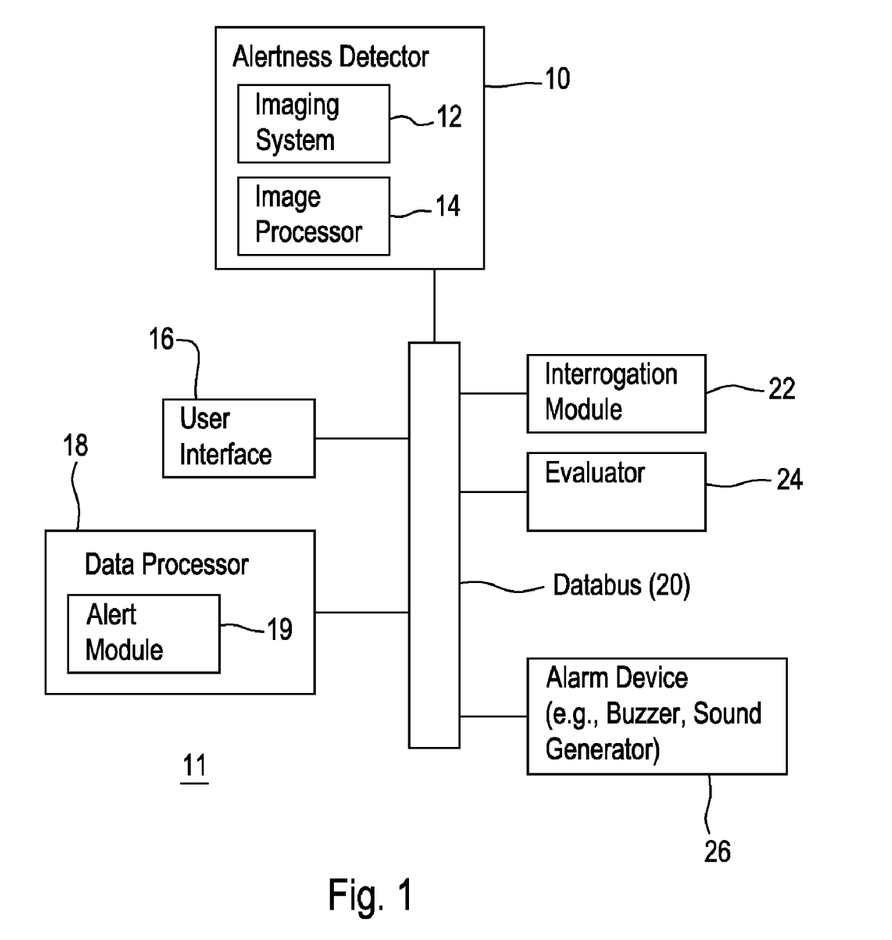
FIG. 1 is a block diagram of one embodiment of a system for maintaining operator alertness.

In accordance with one embodiment of FIG. 1, a system 11 for maintaining operator alertness comprises an alertness detector 10, a user interface 16, a data processor 18, an interrogation module 22, an evaluator 24, and an alarm device 26 that communicate via a databus 20.

In one embodiment, the alertness detector 10 comprises an imaging system 12 and an image processor 14. The imaging system 12 collects image data associated with the operator to detect a physical status of the operator. The physical status indicates a first level of operator alertness. As used herein, the level of operator alertness is inversely proportional to the level of operator drowsiness. The image processor 14 processes the collected image data to determine the physical status of the operator.

The alertness detector 10 may be configured or programmed to provide one or more of the following features: (1) an imaging system 12 or eye monitoring device for monitoring a blink rate, eye closure rate (e.g., PERCLOS), or other eye status of the operator, (2) an imaging system 12 for monitoring a tilt, orientation or movement of the head of the operator, and (3) an imaging system 12 for monitoring an observed tilt angle of the head of an operator to determine if the observed tilt angle exceeds a critical angle with respect to a reference angle of the head.

A user interface 16 comprises one or more of the following: a keypad, a keyboard, a display, a pointing device (e.g., a mouse or trackball), a switch, a rotary switch, a speech recognition module, a voice recognition system, or another input device. In one embodiment, a user interface 16 or interrogation module 22 requests an input of the operator at a request time. An evaluator 24 measures at least one of an accuracy of the operator response to the requested input and a response time of the operator from the request time. For example, the evaluator 24 may include a timer for measuring the response time.

The requested user input may vary in accordance with various illustrative examples. In a first example of requested user input, the user interface 16 cooperates with an interrogation module 22 to ask the operator to answer at least one of a mathematical, verbal or trivia question. In a second example, the user interface 16 cooperates with an interrogation module 22 to ask the operator to place the operator's finger or digit on a target area (e.g., stationary or moving target area or geometric object) of touch screen display of the user interface 16. In a third example of requested user input, the interrogation module 22 comprises a voice recognition module or speech recognition module that asks to operator to answer a verbal or oral question. Further, the interrogation module 22, the evaluator 24 or voice recognition module determines if an operator said correct words (or a defined reply) in response to a query within the allotted time to a desired degree of accuracy (e.g., 90% reliability or greater).

In a fourth example, a user interface 16 may request an operator's entry or selection of a second level of operator alertness. The second level of operator alertness may be independent from the first level of operator alertness. For instance, the second level of operator alertness may represent the operator's self-evaluation of the operator's alertness level or drowsiness level at a request time. The user interface 16 is arranged to accept an input of a second level of operator alertness from a self-evaluation of the operator. The evaluator 24 may evaluate an accuracy of the operator response to the requested input and a response time of the operator from the request time.

The data processor 18 may comprise an alert module 19. The alert module 19 generates alarm data or an alarm signal to alert the operator based on (a) the first level of operator alertness and at least one of the measured accuracy and operator response time indicating the inattentive state, or (b) the first level of operator alertness and the second level of operator alertness. In one embodiment, the alert module 19 is arranged to increase at least one of an intensity of the alarm commensurate with an aggregate decrease in the first level of operator alertness and the second level of operator alertness. In another embodiment, a data processor 18 determines if the first level of operator alertness is consistent with the second level of operator alertness. If there is an aggregate decrease in the first level of operator alertness and the second level, the alert module 19 may increase the intensity of the alarm generated by the alarm device 26. Further, the alert module 19 or data processor 18 increases the frequency of the request for input of a second level of operator alertness if the first level is inconsistent with the second level.

An alarm device 26 may comprise an audible alarm, a buzzer, an oscillator, a piezoelectric buzzer, a display, an actuator, a motor, a vibrator, a logic output (e.g., transistor-to-transistor level output or complementary metal oxide semiconductor (CMOS) level output), relay output or another device for providing stimulus to the operator to maintain an alert or attentive state, or to prevent or reduce drowsiness or inattentiveness. In one example, the logic output or relay output may be used to turn off or shut down the vehicle, or invoke autonomous control associated with the vehicle or an autopilot system, if the operator is determined to be sufficiently inattentive or drowsy. If the alert device is an audible alarm, the alert device may have a variable frequency, pitch, volume or loudness, or other features to facilitate maintaining operator alertness.

Figure 2:
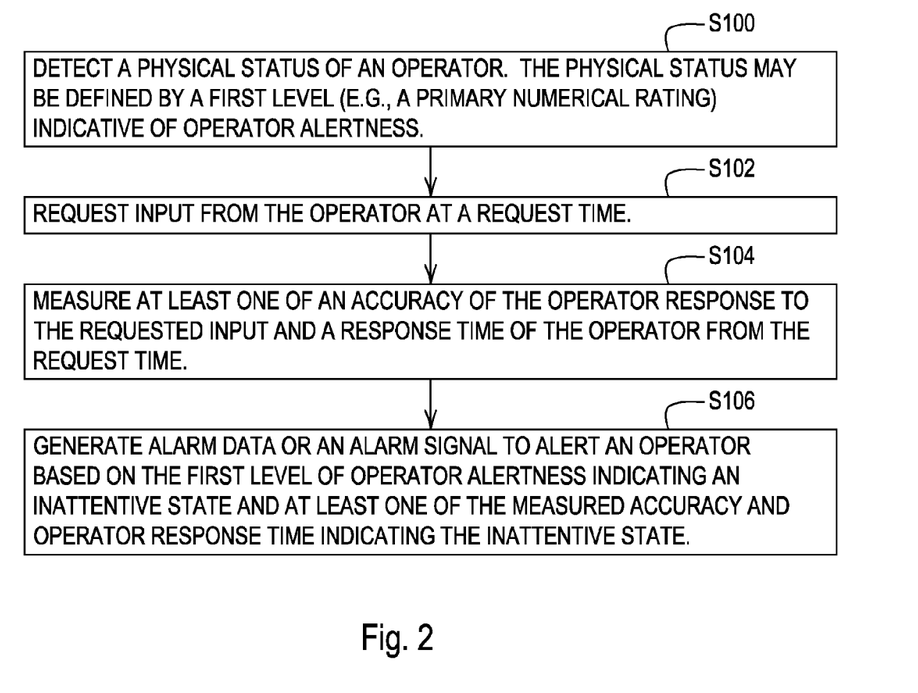
FIG. 2 is a flow chart of a first embodiment of method for maintaining operator alertness.

FIG. 2 is a flow chart of a method for maintaining operator alertness. The method begins in step S100.

In step S100, a detector 10 detects a physical status of an operator. The physical status may be defined by a first level indicative of operator alertness. The detector 10 may estimate the physical status or first level of operator alertness based on head orientation or movement, eyelid analysis, or both.

Material changes in head orientation from an alert state may indicate that the operator is drowsy, fatigued, or otherwise inattentive. The imaging system 12 establishes a reference image for a reference head orientation in an alert state and collects collected images during operation of the vehicle. During operation of the vehicle, the image processor 14 compares the collected images to the reference image to determine whether the operator is alert or not. For example, the imaging system 12 may monitor a tilt of the head of the operator to determine whether the head exceeds a critical angle with respect to a reference angle. If the head exceeds a critical angle with respect to a reference angle over a minimum time interval, the imaging system 12 may determine that the operator is inattentive for a certain observed time interval.

Eye analysis (e.g., eyelid analysis) may establish a reference blink rate or eyelid behavior for an alert operator. The eye analysis may be carried out by various techniques that may be applied alternately or cumulatively. Under a first technique for eye analysis, the imaging system 12 collects collected images during operation of the vehicle to estimate an observed blink rate of the operator. During operation of the vehicle, the image processor 14 compares the observed blink rate (or observed blink rate data) to the reference blink rate (or reference blink rate data) to determine whether the operator is alert or not. If the observed blink rate is materially slower than the reference blink rate, the operator may be inattentive.

Under a second technique for eye analysis, the imaging system 12 collects collected images during operation of the vehicle to estimate an observed eye status of the operator. The imaging system 12 stores a reference eye status based on an alert state of the operator or an inattentive state. During operation of the vehicle, the image processor 14 compares the observed eye status data to the reference eye status data to determine whether the operator is alert or not. In one configuration, if the observed eye status is materially distinct from a reference eye status associated with an alert state of the operator, the operator may be inattentive. In another configuration, if the observed eye status data is materially similar to a reference eye status associated with an inattentive state of the operator, the operator may be deemed inattentive.

Under a third technique for eye analysis, the image processor 14 compares observed eyelid behavior to reference eyelid behavior to determine if there is a material change indicative of inattentive behavior.

Under a fourth technique for eyelid analysis, the eyelid analysis uses PERCLOS or a similar metric as a measure of drowsiness. PERCLOS measures the proportion of the time that the driver's eyes (or eyelids) are at least approximately 80% closed over a specified time interval. The greater the proportion of time that an operator's eyes are at least approximately 80% closed, the lower the corresponding level of alertness or first level. Similarly, the greater the proportion of time that an operator's eyes are at least approximately 80% closed, the higher the corresponding level of drowsiness.

In step S102, a user interface 16, interrogation module 22 or both requests input from the operator at a request time. Step S102 may be carried out in accordance with various procedures, which may be applied alternately or cumulatively.

Under a first procedure, the interrogation module 22 asks the operator to answer at least one of a mathematical, verbal or trivia question. The interrogation module 22 may ask one or more questions at a regular rate or a rate (e.g., frequency) that is controlled by the data processor 18 or alert module 19 based on the alertness of the operator. For instance, the alert module 19 or data processor 18 may increase the frequency of the questions in response to increased drowsiness or decreased attentiveness of the operator.

Under a second procedure, the interrogation module 22 asks the operator to place the operator's finger (or another object) on a target area of a touch screen display. For example, the interrogation module 22 may generate a stationary or moving object (or image) on a display of a user interface 16. If the display is equipped with a touch screen, the interrogation module 22 may measure the time for a finger (or another object) to touch the stationary or moving object.

Under a third procedure, the touch screen display may be replaced with a display and a rotary switch or another input device for entering or inputting operator data in response to a request or query of the interrogation module 22.

Under a fourth procedure, the operator may be requested to align the cursor on the display (e.g., by using a pointing device) with a stationary or moving object projected on the display and the response time may be measured to attain spatially coextensive alignment. The object may be altered (e.g., decreased or increased in size or dimensions) to make the task more difficult or interesting, for example.

Under a fifth procedure, the interrogation module 22 requests input of a second level of operator alertness from a self evaluation of the operator. For example, the operator may be prompted to enter or select a level of alertness from a menu or otherwise. The levels of alertness may be expressed on a numerical scale, a verbal scale, or otherwise. Further, the evaluator 24 or interrogation module 22 may convert verbal scale entries or selections into corresponding numerical levels, or vice versa.

In step S104, an evaluator 24 measures at least one of an accuracy of the operator response to the requested input and a response time of the operator from the request time. The accuracy of the operator response and the response time provides an additional measure of the alertness or attentiveness of the operator. The additional measure may be used to supplement the detection of the physical status of the operator via the imaging system 12 and imaging processor 14. The imaging system 12 may rely upon eye analysis, head orientation, head movement, or other visual indicators of attentiveness or alertness. Accordingly, false positive indications of the inattentiveness of the operator may be reduced by considering the operator response accuracy, the response time, or both in addition to the detected physical status via the operator system. Similarly, false negative indications of operator inattentiveness may be reduced by considering the operator's self evaluation or second level of alertness, if available.

In step S106, a data processor 18 or alert module 19 generates alarm data or an alarm signal to alert an operator based on the first level of operator alertness indicating an inattentive state and at least one of the measured accuracy and operator response time indicating the inattentive state. For example, the data processor 18 or alert module 19 transmits the alarm data or an alarm signal to the alarm device 26.

Figure 3:
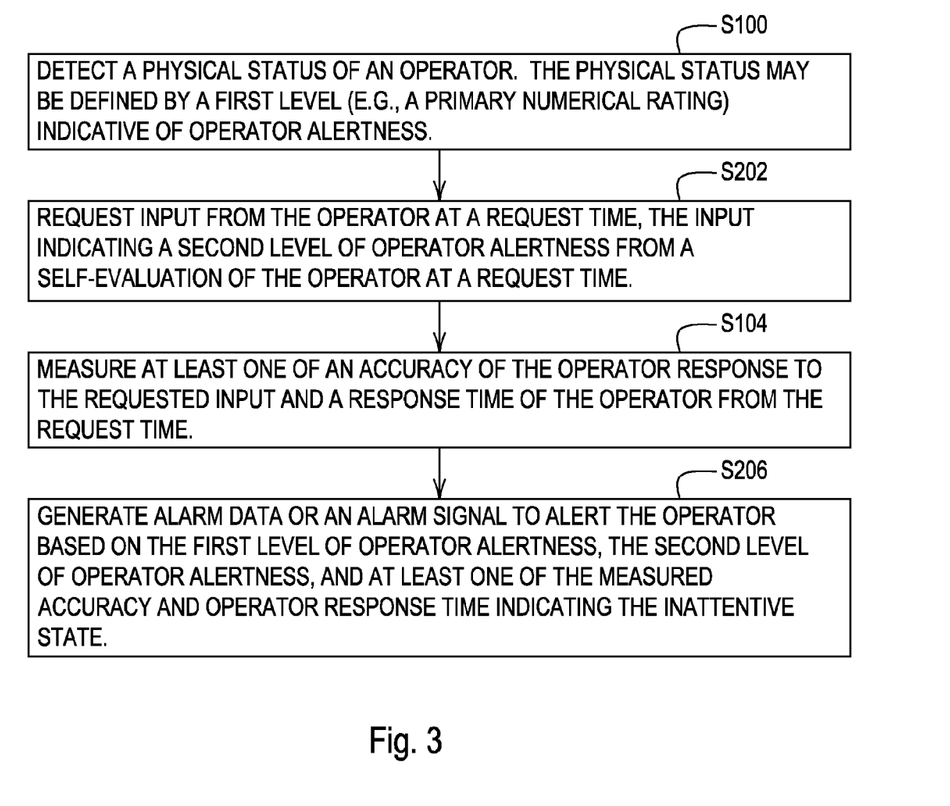
FIG. 3 is a flow chart of a second embodiment of method for maintaining operator alertness.

The method of FIG. 3 is similar to the method of FIG. 2, except the method of FIG. 3 replaces step S102 with step S202 and replaces step S106 with step S206. Like reference numbers in FIG. 2 and FIG. 3 indicate like steps or procedures.

In step S100, a detector 10 detects a physical status of an operator. The physical status may be defined by a first level indicative of operator alertness.

In step S202, a user interface 16 or interrogation module 22 requests input from an operator at a request time, where the input indicates a second level of operator alertness from a self-evaluation of the operator at the request time. Step S202 may be carried out in accordance with various techniques, which may be applied alternately or cumulatively. Under a first technique, the operator may be requested to rank his level of drowsiness or alertness on a numerical scale. Under a second technique, the operator may be requested to rank his level of drowsiness or alertness on a verbal scale. For instance, the verbal scale may include one or more of the following assessments of drowsiness, among others: very drowsy, drowsy, slightly drowsy, and not drowsy. Under a third technique, the operator may be required to enter or select his rate of sleepiness from a list or menu of choices. For example, the operator may rank his or her sleepiness in accordance with the Stanford Sleepiness Scale. The Stanford Sleepiness Scale has numerical scale ratings from 1-7 with corresponding descriptions, where 1 is "wide awake" and 7 is "no longer fighting sleep, sleep onset soon" with various intermediate levels.

If the operator is not fully candid about his self-rating of attentiveness or sleepiness, the system may keep a record for future reference to adjust a weighting factor or weight applied to the operator's input or second level of operator alertness. For instance, the interrogation module 22 or evaluator 24 may reduce the weighting factor (e.g., second weighting factor) applied to a second level of operator alertness from a self-assessment of the operator, if the operator has under-rated his or her inattentiveness on a historical basis. Further, if the operator has a historical record of inaccurately entering an alertness self-assessment, the interrogation module 22 or user interface 16 may increase the frequency of requests for information from an operator to verify how alert the operator truly is.

In step S104, an evaluator 24 measures at least one of an accuracy of the operator response to the requested input and a response time of the operator from the request time.

In step S206, an alert module 19 and data processor 18 generates alarm data or an alarm signal to alert the operator based on the first level of operator alertness, the second level of operator alertness, and at least one of the measured accuracy and operator response time indicating the inattentive state. For example, the data processor 18 of alarm module sends alarm data or an alarm signal to alert the operator based on the first level of operator alertness, the second level of operator alertness or both.

In one example of executing step S206, the data processor 18 or alarm module may determine if the first level of operator alertness is consistent with the second level of operator alertness. Further, the data processor 18 or alert module 19 may increase the frequency of the request for input of a second level of operator alertness if the first level is inconsistent with the second level.

In another example of executing step S206, the alert module 19 increases at least one of an intensity of the alarm of the alarm device 26 commensurate with an aggregate decrease in the first level of operator alertness and the second level of operator alertness.

Figure 4:
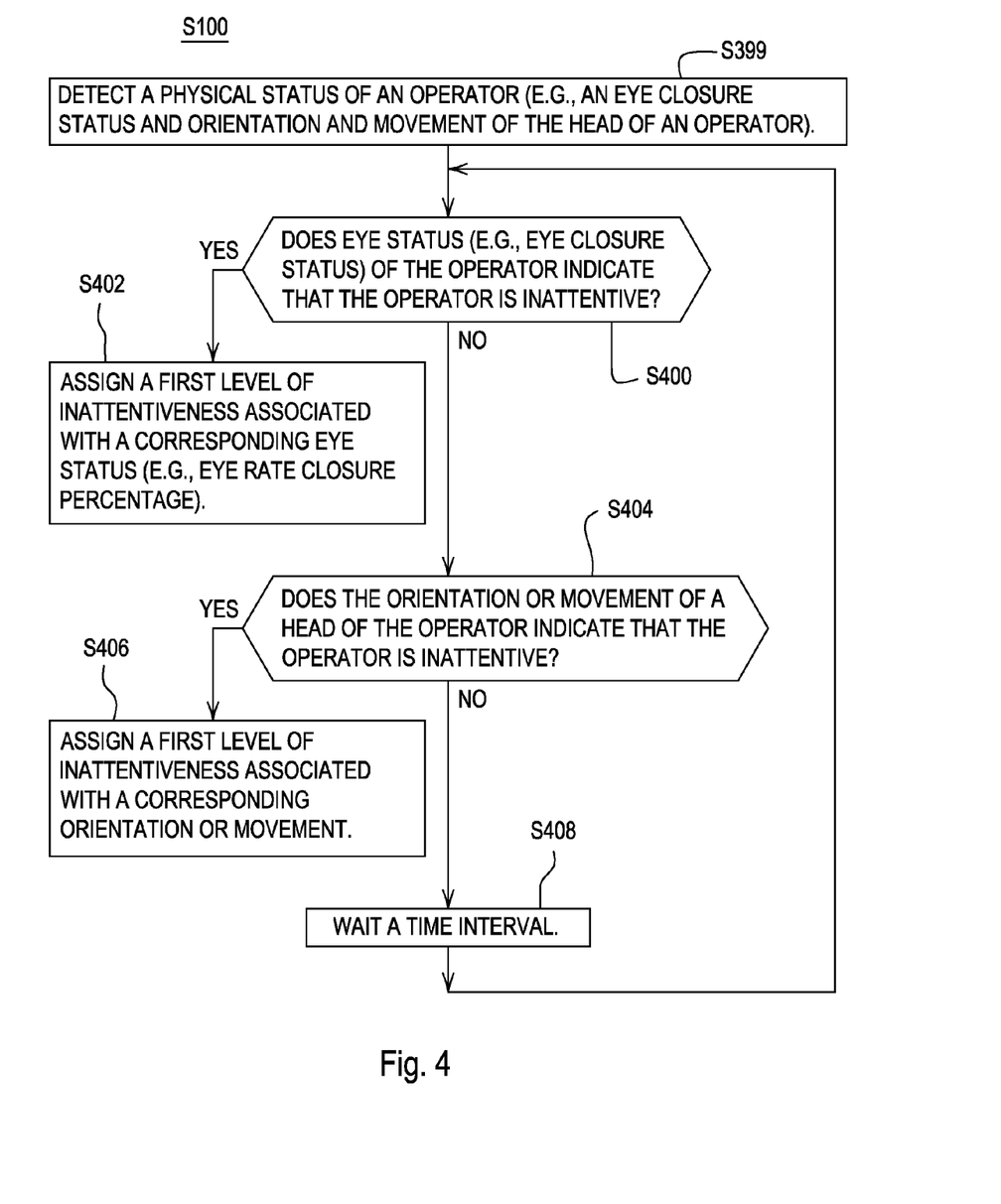
FIG. 4 is a flow chart of a procedure for detecting alertness of an operator.

The method of FIG. 4 provides one illustrative example of carrying out step S100. The method of FIG. 4 may be applied to the method of FIG. 2 or FIG. 3, for example. The method of FIG. 4 begins in step S399.

In step S399, a detector 10 or imaging system 12 determines a physical status of an operator. For example, the detector 10 determines an eye status (e.g., an eye closure status) and head orientation or head movement status of an operator.

In step S400, a detector 10 or imaging system 12 determines an eye status (e.g., eye closure status) of the operator to decide whether the operator is attentive or inattentive. If the eye status (e.g., eye closure status) indicates that an operator is inattentive, then the method continues with step S402. However, if the eye status (e.g., eye closure status) indicates that an operator is attentive, then the method continues with step S404.

In step S402, a data processor 18 or alert module 19 assigns a first level of inattentiveness (or alertness) associated with a corresponding eye closure status (e.g., eye closure rate percentage).

In step S404, the detector 10 or imaging system 12 determines whether the orientation or movement of a head of the operator indicates that the operator is inattentive. If the orientation or movement of the head of the operator indicates that an operator is inattentive, then the method continues with step S406. However, if the orientation and movement of the head indicates that an operator is attentive, then the method continues with step S408.

In step S406, the detector 10 or imaging system 12 assigns a first level of inattentiveness (or alertness) associated with a corresponding orientation or movement of the operator (e.g., the operator's head). The orientation of the operator's head may be defined in terms of tilt of the head or angular displacement of the head from a reference axis indicative of alertness, for example.

In step S408, the detector 10 or imaging system 12 waits a time interval prior to initiating or repeating step S400. The time interval may be adjusted based on the processing throughput and processing resources of the imaging system 12, the image processor 14, and the data processor 18, among other considerations.

Figure 5:
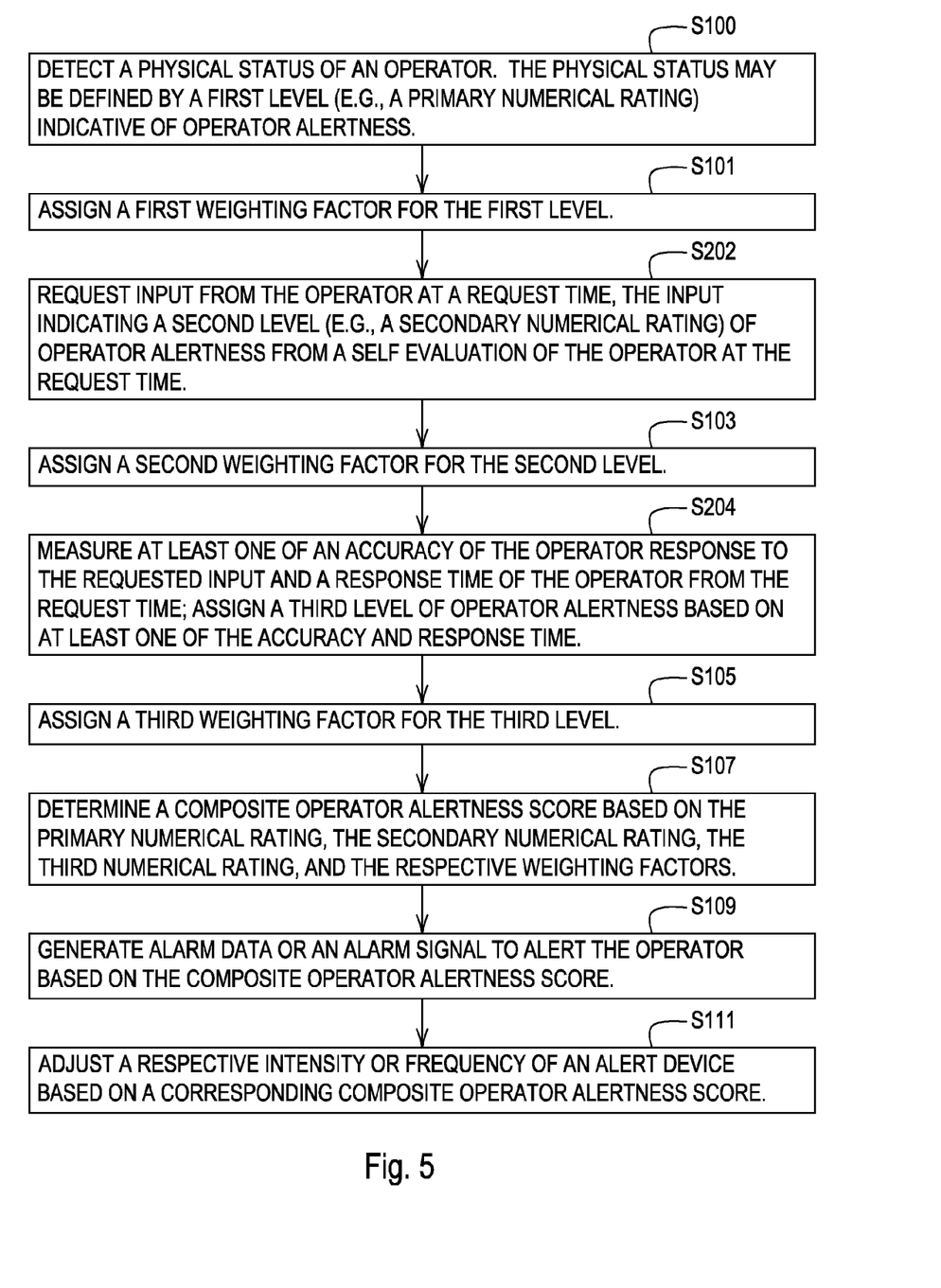
FIG. 5 is a flow chart of a third embodiment of method for maintaining operator alertness.

FIG. 5 is a flow chart of a method for maintaining operator alertness. The method begins in step S100.

In step S100, a detector 10 or imaging system 12 detects a physical status of an operator. The physical status may be defined by a first level indicative of operator alertness. In a first example, the first level may represent an alert state, or an inattentive state. In a second example, the first level may represent a binary representation where a 0 or low logic level represents inattentiveness and a 1 or high logic level represents attentiveness, or vice versa. In a third example, the first level may represent a primary numerical rating for the first level.

In step S101, a detector 10 or data processor 18 assigns a first weighting factor for the first level of operator alertness. The first weighting factor may be selected to be commensurate with the significance, accuracy, or reliability of the detection of the physical status of the operator. Accordingly, the first weighting factor may depend upon how the physical status of the operator is determined and what alertness detector 10, imaging system 12, and image processor 14 is used. For instance, the first weighting factor may vary if eye status (e.g., eye closure status) is used versus the tilting of an operator's head to estimate the first level of operator alertness. In addition, the first weighting factor may vary based on a respective reliability level of particular eye status algorithm, a particular head tilt algorithm, or another algorithm that is applied to estimate the first level of operator alertness. In one embodiment, to the extent that the first level of alertness is more reliable, the first weighting factor may be increased; to the extent that the first level of alertness is less reliable, the first weighting factor may be decreased.

In step S202, a user interface 16, interrogation module 22 or both requests input from the operator at a request time. For example, the input indicates a second level (e.g., secondary numerical rating) of operator alertness from a self-evaluation of the operator at a request time. The operator may be asked to rank himself or herself with respect to alertness on a numerical or verbal rating scale.

In step S103, an evaluator 24 or data processor 18 assigns a second weighting factor to the second level. For instance, the second weighting factor may be selected based on the general accuracy of operator input, historical accuracy of an operator input, estimated reliability of operator input, historical reliability of a particular operator, historical reliability of a particular group of operators, or statistical data associated with a statistically significant sample of operators. The estimated reliability of an operator may vary by age of the operator, by sex of the operator, by heart rate or biometric activity of the operator, or another characteristic of the operator detected during or prior to the requested input at a request time. In one embodiment, to the extent that the second level of alertness is more reliable, the second weighting factor may be increased; to the extent the second level of alertness is less reliable, the second weighting factor may be decreased.

In step S204, an evaluator 24 or interrogation module 22 assigns a third level of operator alertness based on a measurement of at least one of an accuracy of the operator response to the requested input and a response time of the operator from the request time. For example, the evaluator 24 measures at least one of an accuracy (e.g., ratio of correct to incorrect responses) of the operator response to the requested input and a response time (e.g., duration) of the operator from the request time. The interrogation module 22 or evaluator assigns a third numerical rating to at least one of the accuracy and the response time. The ratio of correct to incorrect responses and the duration may be assigned a corresponding composite score by reference to an equation, a look-up table, a database, or otherwise, for instance.

In step S105, an interrogation module 22 or evaluator 24 assigns a third weighting factor to the corresponding third level of operator alertness. The third weighting factor may be greater if both response time and accuracy are used for the third level and less if only accuracy or response time is used for the third level.

In step S107, a data processor 18 or alert module 19 determines a composite operator alertness score based on the primary numerical rating, the secondary numerical rating, the third numerical rating, and their respective weighting factors including the first weighting factor, the second weighting factor and the third weighting factor. For example, the composite operator score may be determined in accordance with the following equation. $S=AX+BY+CZ$, where S is the composite operator score, A is the first weighting factor, X is the first numerical rating, B is the second weighting factor, Y is the second numerical rating, C is the third weighting factor, and Z is the third numerical rating. The first level is associated with the first numerical rating; the second level is associated with the second numerical rating; and the third level is associated with the third numerical rating.

As used herein, the level of operator alertness is inversely proportional to the level of operator drowsiness. For example, a level of operator alertness may be replaced by an inverse level of operator drowsiness. Accordingly, if X represents operator alertness, $1/X$ would represent a first indicator of operator drowsiness; if Y represents operator alertness, $1/Y$ would represent a second indicator of operator drowsiness; and if Z represents operator alertness, $1/Z$ would represent a third indicator of operator drowsiness. Accordingly, the above equation may be presented in terms of a level of operator drowsiness by inverting the values of operator alertness.

In step S109, a data processor 18 or alert module 19 generates alarm data or an alarm signal to alert an operator based on the composite operator alertness score. In an alternate embodiment, the alarm data may be transmitted to an autonomous navigation system, an automatic steering system, a Global Positioning System (GPS) and controller for controlling the steering of a vehicle to compensate for the operator's lack of attentiveness (e.g., short durations of unconsciousness or sleep).

In step S111, a data processor 18 or alarm module adjusts a respective intensity, frequency, or both of an alert device based on a corresponding operator alertness score. For example, the intensity may refer to the volume of an audible alarm, whereas the frequency may refer to a duty cycle of the audible alarm or may be proportional to the time interval between when the alert device is active and inactive. If the alert device comprises a linear motor, a vibrator, an actuator, or another motion inducing device, the intensity may refer to the force or amplitude of the movement created by the motion inducing device, whereas the frequency may refer to a duty cycle or an oscillation frequency of the motion inducing device. If the alert device comprises a visual display, the intensity may refer to the brightness, hue, or movement of objects within a visual image, for instance.

In an alternate embodiment, step S111 may be omitted.

The system and method of the invention is well-suited for enhancing reliable detection of operator alertness. For example, the system may be applied to reduce false positive detection of operator drowsiness that might otherwise result from the use of the imaging detection system, an eyelid analysis, head orientation analysis, or head movement analysis of the operator. If the vehicle traverses a rough road or off-road situation, the operator's head may bob or simulate motion that falsely indicates the operator is inattentive.

Having described the preferred embodiment, it will become apparent that various modifications can be made without departing from the scope of the invention as defined in the accompanying claims.

The following is claimed:

1. A method for maintaining operator alertness, the method comprising:

detecting a physical status of an operator, the physical status indicating a first level of operator alertness;

requesting an input of an operator at a request time, the input indicating a second level of operator alertness at the request time;

measuring an accuracy of the operator response to the requested input and a response time of the operator from the request time;

generating at least one of alarm data or an alarm signal to alert an operator based on the first level of operator alertness indicating an inattentive state and the measured accuracy and response time of the operator indicating the inattentive state; and responsive to determining decreased attentiveness of the operator, increasing a request frequency for the input of the second level of operator alertness, wherein the second level of operator alertness is from a self-evaluation of the operator.

2. The method according to claim 1 wherein the detecting the physical status of an operator comprises monitoring an eye status or blink rate of the operator.

3. The method according to claim 1 wherein the detecting the physical status of an operator comprises monitoring a tilt of the head of the operator to determine if the head exceeds a critical angle with respect to a reference angle.

4. The method according to claim 1 wherein the requesting comprises asking the operator to answer at least one of a mathematical question or a trivia question.

5. The method according to claim 1 wherein the requesting comprises asking the operator to place a finger of the operator on a target area of a touch screen display.

6. The method according to claim 1 wherein the generating comprises generating the alarm data or the alarm signal based on the first level of operator alertness from the physical status of the operator, the second level of operator alertness from the self-evaluation of the operator, and the measured accuracy and response time of the operator indicating the inattentive state.

7. The method according to claim 1 further comprising:
determining whether the first level of operator alertness is consistent with the second level of operator alertness; and
responsive to determining that the first level of operator alertness is inconsistent with the second level of operator alertness, increasing the request frequency for the input of the second level of operator alertness.

8. The method according to claim 1 wherein the generating comprises increasing an intensity of the alarm commensurate with an aggregate decrease in the first level of operator alertness and the second level of operator alertness.

9. The method according to claim 1 wherein the detecting the physical status of an operator comprises monitoring an eye status of the operator and assigning a first level of alertness or inattentiveness associated with the eye status if the eye status indicates the operator is inattentive.

10. The method according to claim 1 wherein the detecting the physical status of an operator comprises monitoring an orientation or movement of the head of the operator and assigning a first level of alertness or inattentiveness associated with the orientation or movement if it indicates the operator is inattentive.

11. A system for maintaining operator alertness, the system comprising:
a detector for detecting a physical status of an operator, the physical status indicating a first level of operator alertness;
a user interface for requesting an input of the operator at a request time, wherein the user interface is arranged to accept the input indicating a second level of operator alertness at the request time;
an evaluator for measuring an accuracy of the operator response to the requested input and a response time of the operator from the request time;
an alert module for generating at least one of alarm data or an alarm signal to alert the operator based on the first level of operator alertness indicating an inattentive state and the measured accuracy and response time of the operator indicating the inattentive state; and
the alert module for increasing a request frequency for the input of the second level of operator alertness in response to determining decreased attentiveness of the operator, wherein the second level of operator alertness is from a self-evaluation of the operator.

12. The system according to claim 11 wherein the detector comprises an eye monitoring device for monitoring an eye status or blink rate of the operator.

13. The system according to claim 11 wherein the detector comprises an imaging system for monitoring a tilt of the head of the operator to determine if the head exceeds a critical angle with respect to a reference angle.

14. The system according to claim 11 wherein the user interface is arranged to ask the operator to answer at least one of a mathematical question or a trivia question.

15. The system according to claim 11 wherein the user interface is arranged to ask the operator to place the operator's finger on a target area of a touch screen display.

16. The system according to claim 11 further comprising:
a data processor for determining whether the first level of operator alertness is consistent with the second level of operator alertness; and
the alert module increasing the request frequency for the input of the second level of operator alertness in response to determining that the first level of operator alertness is inconsistent with the second level of operator alertness.

17. The system according to claim 11 wherein the alert module is arranged to increase an intensity of the alarm commensurate with an aggregate decrease in the first level of operator alertness and the second level of operator alertness.

18. A method for maintaining operator alertness, the method comprising:
detecting a physical status of an operator, the physical status indicating a first level of operator alertness;
assigning a first weighting factor for the first level of operator alertness;
requesting an input of an operator at a request time, the input indicating a second level of operator alertness at the request time;
assigning a second weighting factor for the second level of operator alertness;
assigning a third level of operator alertness based on a measurement of an accuracy of the operator response to the requested input and a response time of the operator from the request time;
assigning a third weighting factor for the third level of operator alertness;
determining a composite operator alertness score based on the first level of operator alertness, the second level of operator alertness, the third level of operator alertness, and their respective weighting factors; and
responsive to determining decreased attentiveness of the operator, increasing a request frequency for the input of the second level of operator alertness, wherein the second level of operator alertness is from a self-evaluation of the operator.

19. The method according to claim 18 further comprising: generating at least one of alarm data or an alarm signal to alert an operator based on the composite operator alertness score.

20. The method according to claim 18 further comprising: adjusting a respective intensity or frequency of an alert device based on a corresponding composite operator alertness score.

21. The method according to claim 18 wherein the composite operator alertness score is determined in accordance with the following equation: $S=AX+BY+CZ$, where S is the composite operator alertness score, A is the first weighting factor, X is a first numerical rating associated with the first level of operator alertness, B is the second weighting factor, Y is a second numerical rating associated with the second level of operator alertness, C is the third weighting factor, and Z is a third numerical rating associated with the third level of operator alertness.

22. The method according to claim 1 wherein the alarm data is transmitted to an autonomous navigation system, an automatic steering system, a global positioning system, and a controller for controlling steering of a vehicle to compensate for the inattentive state of the operator.

23. The system according to claim 11 wherein the alarm data is transmitted to an autonomous navigation system, an automatic steering system, a global positioning system, and a controller for controlling steering of a vehicle to compensate for the inattentive state of the operator.

24. The method according to claim 19 wherein the alarm data is transmitted to an autonomous navigation system, an automatic steering system, a global positioning system, and a controller for controlling steering of a vehicle to compensate for an inattentive state of the operator.

* * * * *